Jan. 7, 1964

M. J. DUER 3,116,990

INTAKE-DRIVEN AIR FILTER WITH VARIABLE SPEED REDUCING DRIVE MECHANISM

Filed Feb. 21, 1961

INVENTOR.
Morris J. Duer
BY
E. E. James
ATTORNEY 9 3,116,990
Patented Jan. 7, 1964

3,116,990
INTAKE-DRIVEN AIR FILTER WITH VARIABLE SPEED REDUCING DRIVE MECHANISM
Morris J. Duer, Vandalia, Ohio, assignor to General Motors Corporation, Detroit, Mich., a corporation of Delaware
Filed Feb. 21, 1961, Ser. No. 90,720
11 Claims. (Cl. 55—294)

This invention relates to air cleaners; more particularly to a self-purging air cleaner unit having a filter cartridge rotatably driven by the air intake suction of an associated device such as an internal combustion engine; and with regard to certain more specific aspects thereof, to a speed reducing driving connection between an intake driven turbine and a rotatable vacuum backwashed filter cartridge unit.

The invention contemplates a filter drive including a relatively simple and inexpensive variable ratio ball type speed reducer which is operable in combination with a suction driven turbine to modulate the relative driven speed of a backwash cleaned filter cartridge in accordance with variations in intake suction and thus in the driving speed of the turbine. The ball type speed reducer and turbine drive of the invention is particularly intended for use in place of the turbine driven compound epicyclic reducing gear mechanism shown and described in greater detail in my copending United States patent application Serial No. 779,781, filed December 11, 1958, and entitled "Self-Cleaning Air Filter."

The foregoing and other objects, advantages and features of the invention will be apparent from the following description of several illustrative embodiments, having reference to the accompanying drawings, in which.

Figure 1:
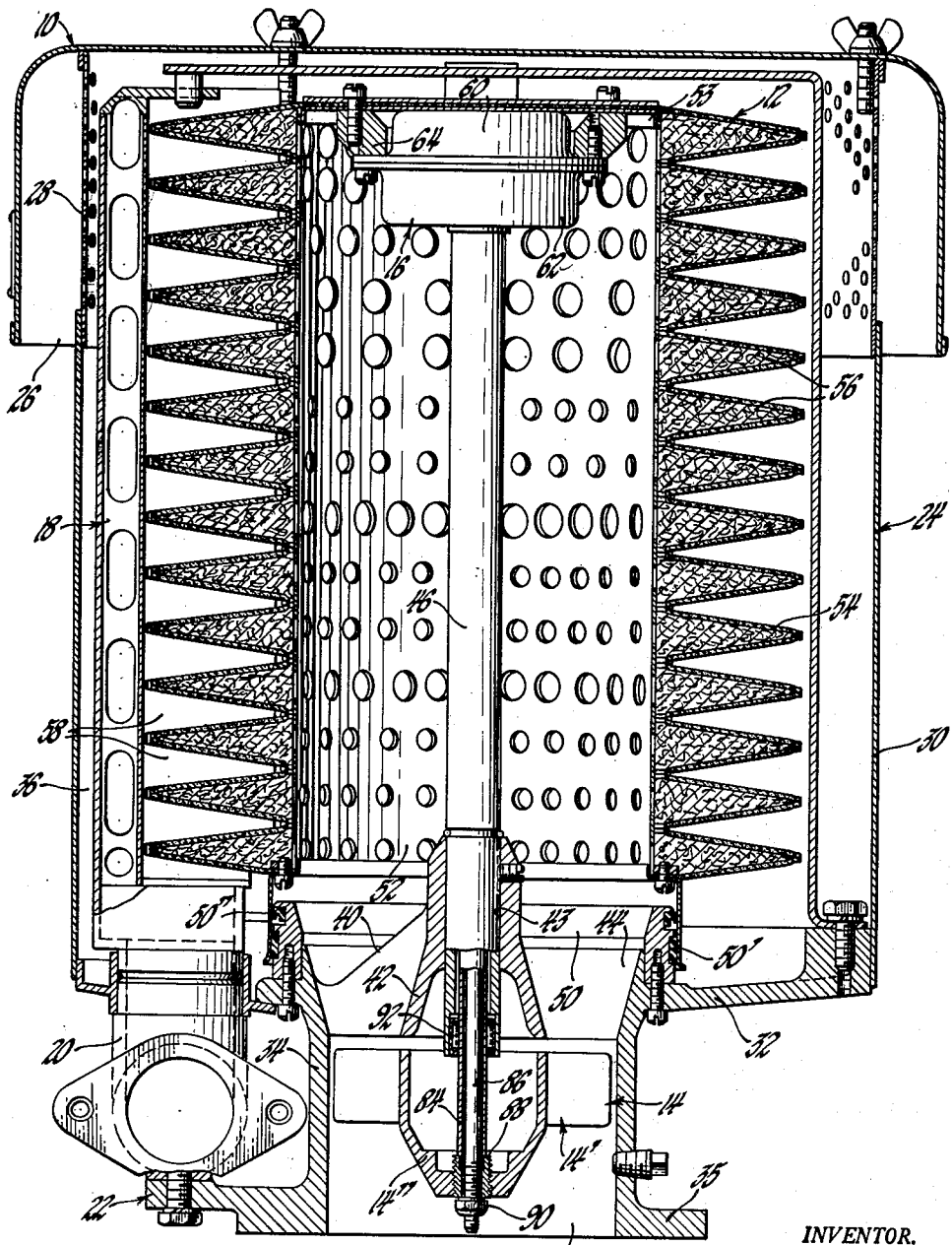
FIGURE 1 is a transverse sectional view of a self-purging air cleaner incorporating a ball type speed reducer and turbine drive constructed in accordance with the invention.

Referring more particularly to FIGURE 1, a self-cleaning air filter embodying the invention is indicated generally by the reference numeral 10 and is adapted to be mounted in the air intake system of an internal combustion engine. The air filter unit comprises a filter cartridge 12 of bellows configuration which is rotatably mounted and driven by an air intake turbine 14 through a ball type speed reducer 16. The cartridge is thus driven at a relatively slow rotational speed past a filter purging nozzle member 18 which is pivotally mounted and connectable to a suitable vacuum source through a swivel elbow 20 supported by a flanged base member 22. In accordance with the invention, the ball type speed reducer is adapted to modulate the relatively slow driven speed of the filter cartridge in accordance with variations in the turbine driving intake suction and resultant speed.

The filter housing includes the base member 22 and an upper cover or casing assembly 24. The upper casing includes an inverted dish shaped hood 26 which has an end wall secured to and closing one end of a cylindrical stone restricting intake screen 28 and a cylindrical side wall spacedly embracing and providing a protective shield or baffle for the intake screen. The screen 28 is preferably formed of perforated sheet metal and is suitably secured at its lower end to a cylindrical sheet metal member 30. The member 30 is in turn supported by a flange 32 which extends radially outwardly from an inner cylindrical portion 34 of the base member 22. The flange 32 thus cooperates with the upper cover assembly 24 to define a filter mounting chamber 36. The base member is also flanged at 35 for mounting the filter unit on an engine air intake member, not shown. The cylindrical portion of the base member thus defines an outlet throat 38 from the filter chamber 36.

A plurality of deflector vanes 40 extend radially inwardly of the cylindrical base portion to a support hub 42 having a central bore 43 therethrough. The lower portion of the support hub is flared radially outwardly and cooperates with the several deflector vanes and the side walls of the cylindrical base portion to define a plurality of nozzle passages 44 increasing the air intake flow velocity through the adjacent turbine blades 14'. A drive support tube 46 is mounted in the hub 42 and extends longitudinally upwardly therefrom to a point adjacent the upper end of the cover defined chamber 36 where it cooperates with the ball reducer drive 16 to support the filter cartridge assembly 12. The lower end of the cartridge assembly is rotatably and sealingly mounted relative to the base member 22 by an adapter ring 50 which circumferentially mounts a cartridge journaling Teflon bearing 50' and a lip seal 50''.

The filter cartridge comprises an inner screen or support cylinder 52 of perforated sheet metal. The cylinder 52 is suitably closed at this upper end by an end cap 53 and supports an outer shell 54 which is formed of a suitable pliable filter material and annularly pleated to provide a bellows configuration. The several annular spaces intermediate the inner support cylinder and the outer felt shell are filled with molded pads 56 of a resilient latex impregnated fiber material such as hair or spun glass. These pads prevent collapse of the felt bellows under engine intake suction and maintain the outer shell in proper sealing relation with vacuum cleaning slits extending longitudinally of pleat-engaging saw-toothed projection or fingers 58 of the nozzle member 18.

Figure 2:
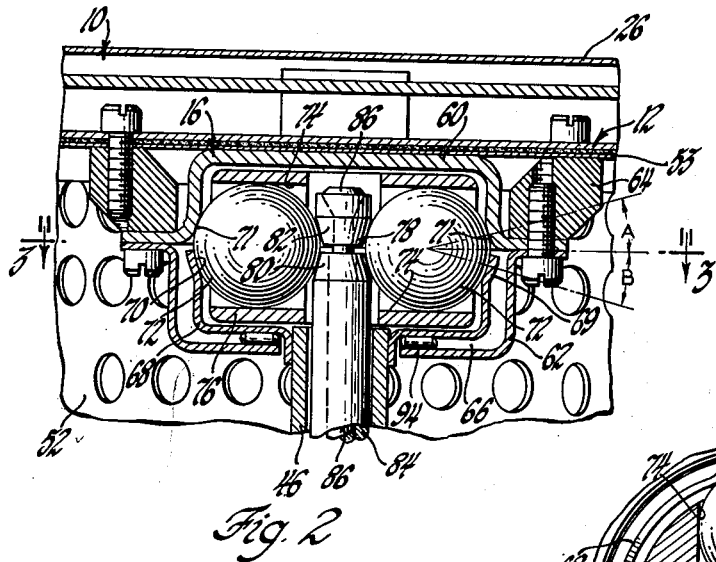
FIGURE 2 is an enlarged fragmentary view corresponding to a portion of FIGURE 1 with portions broken away and in section to show certain details of a ball type speed reducer constructed in accordance with the invention.
Figure 3:
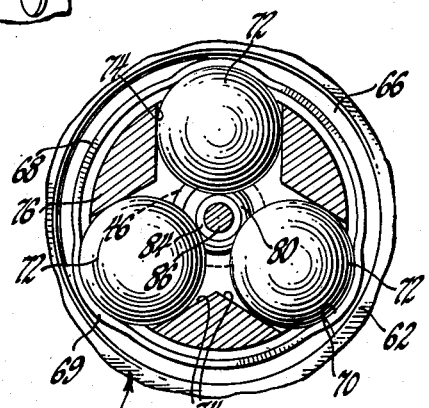
FIGURE 3 is a fragmentary sectional view taken substantially in the plane and in the direction of the arrows indicated at 3—3 in FIGURE 2.

As best seen in FIGURES 2 and 3, the ball reducer drive includes two cup or hat-shaped housing members 60 and 62 which are secured to the filter cartridge end cap 53 by a spacer ring 64 and cooperate to define a drive housing chamber 66. The lower housing member 64 has a central opening therethrough spacedly embracing the upper end of the support tube 46. A stationary reaction cup 68 is mounted on the upper end of the tube 46 within the housing chamber and has a frusto-conically flared upper flange 69. This flange defines a stationary reaction surface 70 which is axially spaced from an oppositely inclined frusto-conical surface formed internally of the upper housing member at 71. The frusto-conical surfaces 70 and 71 are reactively and drivingly engaged by three planetary drive balls which are equiangularly disposed and mounted for rolling movement within ports 74 extending radially through an annular carrier member 76. Inwardly, the several balls 72 are rotatably driven by a sun groove or raceway 78 defined by two axially spaced frusto-conically beveled surfaces 80 and 82 formed on or carried by an outer sleeve shaft 84 and an inner shaft 86, respectively.

The shafts 84 and 86 are drivingly connected to the turbine 14 at their lower ends by a threaded ferrule 88 which is drivingly interposed therebetween and threadably mounts the hub 14'' of the turbine member. The shafts 84 and 86 are axially shiftable with respect to each other to effect adjustment of the ball engaging surfaces of the raceway 78 by threadable tightening of a nut 90 on the lower end of the inner shaft 86. The turbine shaft assembly is spacedly journaled by a needle bearing 92 mounted within the lower end of the support tube 46 and upwardly by the planetary drive balls which similarly serve to journal the upper end of the cartridge assembly with respect to the support tube 46 and the reaction cup 68. The filter cartridge is also rotatably mounted with respect to the support tube by thrust needle bearings 94 interposed between the spaced bottom walls of the reaction cup 68 and of the drive housing member 62.

To provide the desired speed reduction between the turbine and the filter cartridge, the frusto-conical surfaces 70 and 71 of the reaction cup 68 and drive housing member 60 are inclined so that the cone of engagement between the balls 72 and the housing surface 71 only slightly exceeds that defined with respect to the reaction surface of the stationary flange 69. These cones of engagement are indicated respectively by the angles A and B in FIGURE 2. In the illustrative embodiment, the angle A is approximately 16° with the angle B being initially about 15° thus providing an initial angular differential in engagement cones of approximately one degree. This angular differential results in an initial designed ratio of speed reduction between the turbine and filter cartridge, e.g. 1400:1. This initial reduction ratio may be increased by tightening the nut 90 on the inner shaft thereby reducing the axial spacing of the raceway surfaces 80 and 82. Such raceway adjustment results in limited outward movement of the planetary balls with resultant deflection of the reaction cup flange which effectively reduces the angular differential in the cones of ball engagement with the surfaces 70 and 71 and thus increases the reduction ratio.

Under engine operating conditions, the intake suction induces turbine rotation and also imparts axial thrust tending to shift the turbine and shaft assembly downwardly. The resultant downward movement of the ball driving raceway 78 shifts the planetary balls radially outwardly against the deflective biasing action of the reaction cup flange. As indicated above, such deflective distortion of the stationary cup flange reduces the angular differential in ball engagement with the surfaces 70 and 71 and thus increases the effective reduction ratio of the drive. The relative driven speed of the filter cartridge is thus reduced as the engine intake suction induced speed of the turbine increases. This intake suction modulation of the speed reducing ratio coupled with the mechanical efficiency achieved in journaling the filter cartridge by the planetary drive balls, permits sufficient cartridge driven speed relative to the filter cleaning nozzle during periods of low speed engine operation with resultant low turbine power but prevents excessive cartridge speed under full engine power and speed operating conditions.

Figure 4:
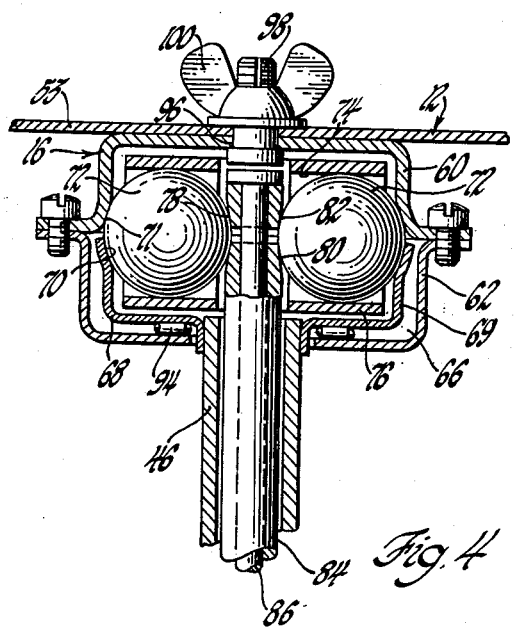
FIGURE 4 is a fragmentary sectional view similar to FIGURE 2 and shows a slightly modified form of ball type speed reducer constructed in accordance with the invention.

In the form of the invention shown in FIGURES 1-3, the peripheral mounting of the drive housing by the spacer ring 66 tends to maintain the upper housing member 60 and the surface 71 against outward deflection by the several planetary drive balls, irrespective of static and dynamic thrust load adjustment of the ball driving raceway 78. In the slightly modified form of speed reducer of FIGURE 4, the several elements are identical with those previously described, and are therefore identified by like reference numerals, except that the upper drive housing member 60 and the cartridge end cap 53 are centrally perforated at 96 and secured together by a flat headed bolt 98 and a wing nut 100 threaded thereon. This mounting of the upper housing permits limited outward and downward deflection of the ball engaged housing surface thereby increasing the range of speed reduction permitted for static and dynamic adjustment of the ball driving raceway 78.

While the foregoing description has been limited to several modifications of a preferred illustrative embodiment, it will be apparent that various changes might be made therefrom without departing from the spirit and scope of the invention as defined in the following claims.

I claim:

1. In a self-cleaning air filter device including a casing defining an inlet chamber and an outlet connectable to an air induction system, a cylindrical filter element rotatably supported intermediate the inlet chamber and the outlet opening, a nozzle member mounted within the casing and having an opening engageable with the inlet chamber exposed surface of the filter element, and means for causing reverse filter cleaning air flow through the filter element and nozzle opening: means for rotatably supporting and driving the filter element relative to the filter cleaning nozzle including a turbine rotatably mounted within the outlet and driven by the air flow induced through the filter element and a ball type speed reducer intermediate the turbine and filter element, said speed reducer comprising a stationary reaction cup supported by the casing in axial alignment with the outlet and a driven cup carried by the filter element in spaced opposed relation to the reaction cup, said cup members having oppositely and differentially inclined frusto-conical surfaces thereon, a plurality of planetary balls rotatably and drivingly engageable with the frusto-conical surfaces of said cup members, an annular carrier rotatably supporting said balls, and shaft means rotatably supporting said turbine within said casing and drivingly engageable with said planetary balls.

2. In a self-cleaning air filter device as defined in claim 1, said shaft means having a beveled groove on the cup adjacent end thereof drivingly engageable with the planetary balls, the frusto-conical surfaces of said cup members having a limited angular differential in their initial cones of ball engagement to provide an initial design reduction ratio and at least one of said cup members being deflectable to modify its cone of engagement with said balls and thereby the reduction ratio of said driving means, and said shaft means being mounted for limited axial movement with respect to said casing and cup members and shiftable by the air flow thrust load imposed on said turbine to cause said beveled groove to effect limited outward movement of said balls thereby deflecting the ball engaging surface of said one cup member and modulating the speed reduction ratio of said driving means in accordance with variations in the air flow induced by the air induction system.

3. In a self-cleaning air filter device as defined in claim 1, the frusto-conical surfaces of said cup members having an initial angular differential in their cones of ball engagement and providing an initial reduction ratio, at least one of said cup members being resiliently deflectable to modify its cone of engagement with said balls and thereby the reduction ratio of said driving means, said shaft means including coaxially shaft members defining an adjustable beveled groove therebetween on the cup adjacent ends thereof, said groove drivingly engaging the planetary balls, and means for adjusting said shaft members to vary the axial dimension of said groove thereby effecting limited outward movement of said balls and deflecting the ball engaging surface of said one cup member to modify the initial speed reduction ratio of said driving means.

4. In a self-cleaning air filter device as defined in claim 3, said shaft means being mounted for limited axial movement with respect to said casing and cup members and shiftable by the air flow thrust load imposed on said turbine to cause said beveled groove to effect limited outward movement of said balls thereby reflecting the ball engaging surface of said one cup member and modulating the speed reduction ratio of said driving means in accordance with variations in the air flow induced by the air induction system.

5. A self-cleaning air filter device including a casing defining an inlet chamber and an outlet opening connectable to an air induction system, a cylindrical filter element rotatably supported intermediate the inlet chamber and the outlet opening, a nozzle member mounted within the casing and having an opening therein engageable with the inlet chamber exposed surface of the filter element, means for causing reverse filter cleaning air flow through the filter element and nozzle opening, and means for rotatably supporting and driving said filter element relative to said filter cleaning nozzle including a turbine rotatably mounted within said outlet opening and driven by the air flow induced through said filter element and a ball type speed reducer intermediate said turbine and filter element, said speed reducer comprising a stationary reaction cup supported by the casing in axial alignment with the outlet opening and having an annular frusto-conical surface thereon, a driven cup member carried by the filter element and having an annular frusto-conical surface thereon oppositely inclined and spaced from that of the reaction cup, a plurality of planetary drive balls rotatably engageable with the frusto-conical surfaces of the cup members and rotatably supporting said filter element with respect to the casing, an annular carrier member having radial ports therein rotatably supporting said balls, shaft means rotatably supported within the casing and extending in axial alignment between the outlet opening and said cup, said shaft means having a beveled groove on the cup adjacent end thereof drivingly engageable with said planetary drive balls, a turbine mounted on said shaft means within said outlet opening and rotatably driven by the air flow induced therethrough, the frusto-conical surface of said cup members having an initial limited angular differential in their cones of ball engagement to provide an initial design reduction ratio and one of said cup members being reflectable to modify its cone of engagement with said balls, and said shaft means being mounted for limited axial movement with respect to said casing and cup members under thrust load imposed on said turbine by the air flow induced through said outlet opening and operable through outward movement of said balls to deflect the ball engaging surface of said one cup member to modulate the speed reduction ratio in accordance with variations in the air flow induced by the air induction system.

6. In a self-cleaning air filter device, a casing defining an inlet chamber and an outlet opening connectable to an air induction system, a cylindrical filter element rotatably supported intermediate the inlet chamber and the outlet opening, a nozzle member mounted within the casing and having an opening therein engageable with the inlet chamber exposed surface of the filter element, means for causing reverse filter cleaning air flow through the filter element and nozzle opening, means for rotatably supporting and driving said filter element relative to said filter cleaning nozzle including a stationary reaction cup supported by the casing in axial alignment with the outlet opening and having an annular frusto-conical surface thereon, shaft means rotatably supported within the casing and extending in axial alignment between the outlet opening and the reaction cup, a turbine mounted on said shaft means within said outlet opening and rotatably driven by the air flow induced therethrough, a driven cup member carried by the filter element and having an annular frusto-conical surface thereon oppositely inclined and spaced from that of the reaction cup, said shaft means having a beveled groove on the cup adjacent end thereof, a plurality of planetary drive balls rotatably engageable with said beveled groove and the frusto-conical surfaces of the cup members and rotatably supporting said filter element with respect to the casing and an annular carrier member having radial ports therein rotatably supporting said balls, the frusto-conical surfaces of said cup members having a limited angular differential in their cones of ball engagement to provide an initial design reduction ratio and one of said cup members being deflectable to modify its cone of engagement with said balls and thereby the reduction ratio of said driving means, and said shaft means being mounted for limited axial movement with respect to said casing and cup members and shiftable under thrust load imposed on said turbine by the air flow induced through said outlet opening to effect limited outward movement of said balls thereby deflecting the ball engaging surface of said one cup member and modulating the speed reduction ratio of said driving means in accordance with variations in the air flow induced by the air induction system.

7. A ball type speed reducer comprising a stationary reaction member having an annular frusto-conical surface thereon, a driven member having an annular frusto-conical surface thereon oppositely inclined and spaced from that of the reaction member, a plurality of planetary drive balls rotatably engageable with the frusto-conical surfaces of said reaction and driven members and rotatably supporting the driven member with respect to the reaction member, an annular carrier member having radial ports therein rotatably mounting said balls, driven shaft means rotatably supported in axial alignment with said cups and having a beveled groove therein drivingly engageable with the planetary drive balls, the frusto-conical surfaces of said reaction and driven members having an initial angular differential in their cones of ball engagement and providing an initial design reduction ratio, at least one of said members being resiliently deflectable to modify its cone of engagement with said balls and thereby the reduction ratio of the reducer, said shaft means being mounted for limited axial movement with respect to said cup members, and means for axially shifting said shaft means and operable through said beveled groove to cause limited outward movement of said balls thereby deflecting the ball engaging surfaces of said one member to modify the speed reduction ratio.

8. In a ball type speed reducer as defined in claim 7, said shaft means including coaxial shaft members defining said beveled groove therebetween and means for adjusting said shaft members to vary the axial dimension of said groove thereby effecting the limited outward movement of said balls and deflection of the ball engaging surface of said one cup member to modify the speed reduction ratio.

9. A ball type speed reducer comprising a stationary reaction member having an annular frusto-conical surface thereon, a driven member rotatably supported with respect to the reaction member and having an annular frusto-conical surface thereon oppositely inclined and spaced from that of the reaction member, driven shaft means rotatably supported in axial alignment with said members and having a beveled groove spacedly embraced by said frusto-conical surfaces, a plurality of planetary drive balls rotatably and drivingly engaged with the beveled groove of said shaft and the frusto-conical surfaces of the members, the frusto-conical surfaces of said members having an initial angular differential in their cones of ball engagement and providing an initial design reduction ratio, at least one of said members being resiliently deflectable to modify its cone of engagement with said balls and thereby the reduction ratio of the reducer, said shaft means being mounted for limited axial movement with respect to said members, and means for axially shifting said shaft means in accordance with variations in the driven speed thereof and operable through said beveled groove to cause limited outward movement of said balls deflecting the ball engaging surfaces of said one member thereby modulating the speed reduction ratio in accordance with the driven speed of said shaft.

10. A combined fluid motor and reduction drive mechanism comprising a casing defining a fluid flow passage, a turbine rotatably mounted within said passage and driven by fluid flow therethrough, a stationary reaction member supported by the casing in axial alignment with the passage and turbine and having an annular frusto-conical surface thereon, a driven member rotatably mounted with respect to said reaction member and having an annular frusto-conical surface thereon oppositely inclined and spaced from that of the reaction member, a plurality of planetary drive balls rotatably and drivingly engaging the frusto-conical surfaces of said members, an annular carrier spacedly embraced by said frusto-conical surfaces and rotatably supporting said balls for limited radial movement with respect thereto, shaft means rotatably supporting said turbine within the casing and extending in axial alignment between said turbine and said members, said shaft means having a beveled groove spacedly embraced by said carrier and drivingly engaging said planetary drive balls, the frusto-conical surfaces of said reaction members having an initial angular differential in their cones of ball engagement providing an initial speed reduction ratio and one of said members being deflectable to modify its cone of engagement with said balls and thereby the reduction ratio therebetween, and said shaft means being mounted for limited axial movement with respect to said casing and members and shiftable under thrust load imposed on said turbine by fluid flow through said passage and operable through said groove to cause limited outward movement of said balls thereby deflecting the ball engaging surface of said one member and modulating the speed reduction ratio in accordance with variations in the fluid driven turbine speed.

11. In a combined fluid motor and reduction drive mechanism as set forth in claim 10, said shaft means including coaxial shaft members defining said beveled groove between the planetary ball adjacent ends thereof, and means for adjusting said shaft members to vary the axial dimension of said groove thereby effecting the limited outward movement of said balls and deflection of the ball engaging surface of said one member to modify the initial speed reduction ratio.

References Cited in the file of this patent

UNITED STATES PATENTS

| | | |
|---|---|---|
| 1,526,493 | Dolton | Feb. 17, 1925 |
| 1,649,220 | Goodloe | Nov. 15, 1927 |
| 1,948,791 | Halstead | Feb. 27, 1934 |

FOREIGN PATENTS

| | | |
|---|---|---|
| 555,215 | Italy | Jan. 19, 1957 |

UNITED STATES PATENT OFFICE
CERTIFICATE OF CORRECTION

Patent No. 3,116,990            January 7, 1964

Morris J. Duer

It is hereby certified that error appears in the above numbered patent requiring correction and that the said Letters Patent should read as corrected below.

Column 2, lines 42 and 43, for "projection" read -- projections --; column 4, line 68, for "reflecting" read -- deflecting --; column 5, line 33, for "reflectable" read -- deflectable --.

Signed and sealed this 7th day of July 1964.

(SEAL)
Attest:

ERNEST W. SWIDER            EDWARD J. BRENNER
Attesting Officer            Commissioner of Patents